United States Patent
Song et al.

(10) Patent No.: US 9,190,665 B2
(45) Date of Patent: Nov. 17, 2015

(54) CRYSTALLINE IRON PHOSPHATE DOPED WITH METAL, METHOD OF PREPARING THE SAME, AND LITHIUM COMPOSITE METAL PHOSPHATE PREPARED THEREFROM

(71) Applicant: SAMSUNG SDI CO., LTD., Yongin-si, Gyeonggi-do (KR)

(72) Inventors: Hyun A Song, Gyeonggi-do (KR); Woo Young Yang, Daejeon (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/360,338

(22) PCT Filed: Dec. 14, 2012

(86) PCT No.: PCT/KR2012/010911
§ 371 (c)(1),
(2) Date: May 23, 2014

(87) PCT Pub. No.: WO2013/089483
PCT Pub. Date: Jun. 20, 2013

(65) Prior Publication Data
US 2014/0319413 A1    Oct. 30, 2014

(30) Foreign Application Priority Data
Dec. 16, 2011  (KR) .................. 10-2011-0136536

(51) Int. Cl.
C01B 25/37    (2006.01)
C01B 25/45    (2006.01)
H01M 10/052   (2010.01)
H01M 4/58     (2010.01)
C01B 25/26    (2006.01)

(52) U.S. Cl.
CPC ............. *H01M 4/5825* (2013.01); *C01B 25/26* (2013.01); *C01B 25/375* (2013.01); *C01B 25/45* (2013.01); *C01P 2002/54* (2013.01); *C01P 2002/72* (2013.01); *C01P 2004/03* (2013.01); *H01M 10/052* (2013.01)

(58) Field of Classification Search
CPC ...... C01B 25/26; C01B 25/37; C01B 25/375; C01B 25/45; C01G 37/00; C01G 49/00; H01M 4/36; H01M 4/5825
USPC ...................................... 252/182.1; 423/306
See application file for complete search history.

(56) References Cited

PUBLICATIONS

Nagaraju et al. "Studies on vanadium-doped iron phosphate catalysts for the ammoxidation of methylpyrazine", Applied Catalysis A: General, vol. 339, Issue 2, May 1, 2008, 99-107.*
Jierong Ying, et al., "Preparation and Characterization of High-Density Spherical $Li_{0.97}Cr_{0.01}FePO_4$/C Cathode Material for Lithium Ion Batteries," Journal of Power Sources, Aug. 2005.
Chinese Office action dated Aug. 5, 2015 for CN 201280061307.1; Hyung A Song, et al.

* cited by examiner

*Primary Examiner* — Peter F Godenschwager
*Assistant Examiner* — Andrew J Oyer
(74) *Attorney, Agent, or Firm* — Lee & Morse, P.C.

(57) ABSTRACT

Provided are a crystalline iron phosphate doped with metals ($MFePO_4$), which is used as a precursor of olivine-structured $LiMFePO_4$ (LMFP) used as a cathode active material for lithium secondary batteries, and a method of preparing the crystalline iron phosphate, in which a crystalline iron phosphate doped with metals has the following Formula I obtained by crystallizing amorphous iron phosphate and doping the latter with a different type of a metal. Formula I: $MFePO_4$, where M is selected from the group consisting of Ni, Co, Mn, Cr, Zr, Nb, Cu, V, Ti, Zn, Al, Ga, Mg, and B. The preparation of olivine-structured LMFP, which is used as a cathode active material for lithium secondary batteries, using the crystalline iron phosphate doped with metals as a precursor can increase efficiency and reduce processing costs as compared to another method of preparing the same by mixing different types of metals in a solid state.

6 Claims, 4 Drawing Sheets

CRYSTALLINE IRON PHOSPHATE DOPED WITH METAL, METHOD OF PREPARING THE SAME, AND LITHIUM COMPOSITE METAL PHOSPHATE PREPARED THEREFROM

CROSS-REFERENCE TO RELATED APPLICATION

This application claims priority to and the benefit of Korean Patent Application No. 2011-0136536, filed on Dec. 16, 2011, the disclosure of which is incorporated herein by reference in its entirety.

BACKGROUND

1. Field of the Invention

The present invention relates to a crystalline iron phosphate doped with metals, a method of preparing the same, and an olivine-structured lithium composite metal phosphate prepared therefrom, and more particularly to a crystalline iron phosphate doped with a metal (MFePO$_4$, hereinafter referred to as an MFP), which is used as a precursor of an olivine-structured lithium composite metal phosphate (LiMFePO$_4$, referred to as an LMFP) used as a cathode active material for lithium secondary batteries, and a method of preparing the same.

2. Discussion of Related Art

In general, as an olivine-structured LMFP used as a cathode active material for lithium secondary batteries, an LMFP (LiMFePO$_4$) doped with a different type of metals has been prepared by mixing different types of metals in a solid state.

However, when a raw material in a solid state is present in a method of preparing an LMFP, in order to prepare nano-sized LMFP particles, there are problems in that particulate raw materials should be used; the raw materials should be pulverized; there are many restrictions on the controls of the shape and size of the particles as compared with a liquid state method; and in case of adding two types or three types of metals at a position of M, there is a potential that a solid solution such as LiFe$_{1-x}$M$_x$PO$_4$ is not properly formed but is present in a state of being separated into LiFePO$_4$ and LiMPO$_4$.

Therefore, the present inventors found that when a crystalline iron phosphate used as a precursor of an LMFP is prepared, that is, in a case in which while a small quantity of a different type of metals is added during crystallizing an amorphous iron phosphate to prepare a crystalline iron phosphate, a metal doping is induced, efficiency on preparing an LMFP from a crystalline iron phosphate doped with metals can be increased and the processing costs can be reduced. Therefore, the present inventors completed the present invention.

SUMMARY OF THE INVENTION

An object of the present invention is to provide a crystalline iron phosphate doped with metals that is a precursor capable of efficiently preparing an olivine-structured LMFP used as a cathode active material for lithium secondary batteries.

Another object of the present invention is to provide a method of preparing a crystalline iron phosphate doped with metals that is the precursor capable of efficiently preparing an olivine-structured LMFP used as a cathode active material for lithium secondary batteries.

Still another object of the present invention is to provide an olivine-structured LMFP used as a cathode active material for lithium secondary batteries prepared from the precursor of a crystalline iron phosphate doped with metals.

In order to achieve the object described above, the present invention provides a crystalline iron phosphate doped with metals represented by the following Formula I, which is obtained by doping it with a different type of metals while crystallizing an amorphous iron phosphate:

MFePO$_4$·2H$_2$O            Formula I (here, M is selected from the group consisting of Ni, Co, Mn, Cr, Zr, Nb, Cu, V, Ti, Zn, Al, Ga, and Mg; and a mole ratio of [Fe] and [M] is 1−x:x, and here, x is 0.01 to 0.05.)

In addition, a crystal structure of the crystalline iron phosphate doped with metals includes Metastrengite 1.

In order to achieve another object described above, the present invention provides a method of preparing a crystalline iron phosphate doped with metals represented by the following Formula I, in which the method includes forming an amorphous iron phosphate; mixing the amorphous iron phosphate thus obtained with a different type of metallic salt; and crystallizing the amorphous iron phosphate mixed with the different type of metallic salt.

MFePO$_4$·2H$_2$O            Formula I (here, M is selected from the group consisting of Ni, Co, Mn, Cr, Zr, Nb, Cu, V, Ti, Zn, Al, Ga, and Mg; and during crystallizing by mixing the amorphous iron phosphate with the different type of metallic salt, a mole ratio of [Fe] and [M] is 1−x:x, and here, x is 0.01 to 0.05.)

In addition, it is preferable that the different type of metallic salt have a structure, MX$_3$ (here, M is selected from the group consisting of Ni, Co, Mn, Cr, Zr, Nb, Cu, V, Ti, Zn, Al, Ga, and Mg, and X is an anion including halogen).

In addition, the amorphous iron phosphate is mixed with an aqueous solution of the different type of metallic salt in a type of slurry in a liquid state.

In order to achieve still another object described above, the present invention provides an olivine-structured LMFP used as a cathode active material for lithium secondary batteries represented by the following Formula II, which is prepared by using a crystalline iron phosphate doped with metals represented by the following Formula I as a precursor:

MFePO$_4$·2H$_2$O            Formula I

LiMFePO$_4$            Formula II (in the above Formulas I and II, M is selected from the group consisting of Ni, Co, Mn, Cr, Zr, Nb, Cu, V, Ti, Zn, Al, Ga, and Mg.)

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
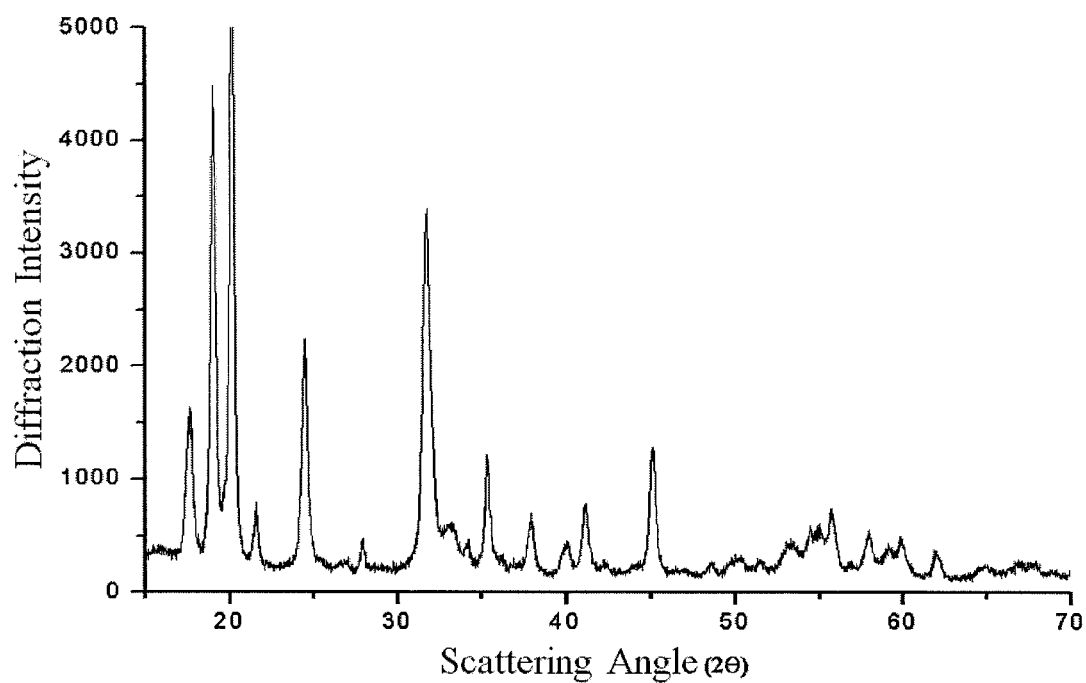
FIG. 1 is a diffraction pattern illustrating a crystalline iron phosphate doped with chrome (CrFePO$_4$) according to an exemplary embodiment of the present invention, which is observed by an XRD.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, the present invention will be described in more detail.

According to an exemplary embodiment of the present invention, the present invention relates to a crystalline iron phosphate doped with metals (MFP) represented by the following Formula I, in which different types of metal are doped while crystallizing an amorphous iron phosphate.

 MFePO$_4$.2H$_2$O    Formula I (here, M is selected from the group consisting of Ni, Co, Mn, Cr, Zr, Nb, Cu, V, Ti, Zn, Al, Ga, and Mg.)

Here, the amorphous iron phosphate (amorphous FePO$_4$) is crystallized into a crystalline iron phosphate, and then the crystalline iron phosphate thus obtained is used as a precursor of an LMFP used as a cathode active material for lithium secondary batteries.

In the present exemplary embodiment, a small quantity of different types of metals is added during crystallizing an iron phosphate, that is, metal doping is induced while preparing a crystalline iron phosphate to obtain a crystalline iron phosphate doped with metals (MFP), and the crystalline iron phosphate doped with metals is used as a precursor to prepare an LMFP, thereby increasing efficiency and reducing the processing costs as compared with the mixing of different types of metals in a solid state during preparing an LMFP.

As described above, examples of the metal to be doped may include Ni, Co, Mn, Cr, Zr, Nb, Cu, V, Ti, Zn, Al, Ga, or Mg, and preferably, chrome, aluminum, or vanadium.

In addition, Fe and M may be mixed to have a mole ratio of [Fe] and [M] of 1−x:x, and here, x is in the range of 0.01 to 0.05.

In addition, a crystal structure of the crystalline iron phosphate doped with metals includes Metastrengite 1.

According to another exemplary embodiment of the present invention, the present invention relates to a method of preparing a crystalline iron phosphate doped with metals represented by the following Formula I, in which the method includes forming an amorphous iron phosphate; mixing the amorphous iron phosphate thus obtained with different types of metallic salts; and crystallizing the amorphous iron phosphate mixed with the different types of metallic salts.

 MFePO$_4$    Formula I (here, M is selected from the group consisting of Ni, Co, Mn, Cr, Zr, Nb, Cu, V, Ti, Zn, Al, Ga, and Mg.)

The forming of an amorphous iron phosphate may be performed by using a method that is generally used in the related art.

For example, FeCl$_3$, and (NH$_4$)$_2$HPO$_4$ or NH$_4$H$_2$PO$_4$ are mixed in a liquid state, as raw materials, and then reacted for preparing. In this case, a mole ratio of [Fe]:[P] may be in the range of 1:0.9 to 1, and a volume ratio of a solid content to a solvent is preferably 5 to 15%.

In this case, it is preferable to adjust the pH of the reactant to be 4 to 7, and it may be reacted by stirring it at a temperature of 25 to 70° C. for 10 to 300 minutes. It is preferable that the reactant be washed two to five times using a reduced pressure filter or a centrifuge, and then dried.

In the mixing of the amorphous iron phosphate with different types of metals, the mixing is performed before crystallizing the amorphous iron phosphate in order to induce the doping of the different types of metals.

Here, examples of the metal to be added for inducing the doping may include Ni, Co, Mn, Cr, Zr, Nb, Cu, V, Ti, Zn, Al, Ga, and Mg, and preferably, chrome, aluminum, or vanadium. At this time, Fe and M may be mixed to have a mole ratio of [Fe] and [M] of 1−x:x, and here, x is in the range of 0.01 to 0.05.

In addition, it is preferable that the different types of metallic salts have a structure, MX$_3$ (here, M is selected from the group consisting of Ni, Co, Mn, Cr, Zr, Nb, Cu, V, Ti, Zn, Al, Ga, and Mg, and X is an anion including halogen.

In addition, the amorphous iron phosphate may be uniformly mixed by being mixed with an aqueous solution of different types of metallic salts in a type of slurry in a liquid state.

Finally, the crystallizing of the amorphous iron phosphate mixed with different types of metallic salts is performed by heating the amorphous iron phosphate mixed with different types of metallic salts under a strong acid. Here, pH thereof is adjusted by adding a phosphoric acid or hydrochloric acid to be in the range of 1 to 3, and then the reactant is heated while stirring at a temperature of 90 to 100° C. for 1 or 6 hours. The reaction is completed at the time of brightening the color of the reactant. Similarly, it is preferable that the reactant be washed two to five times using a reduced pressure filter or a centrifuge, and then dried.

Meanwhile, a crystal structure of an iron phosphate (FePO$_4$.2H$_2$O) includes Strengite, Metastrengite 1, and Metastrengite 2. In the process of crystallizing, Strengite is produced at a pH of 3 to 4, Metastrengite 1 is produced at a pH of 1 to 2, and Metastrengite 2 is produced at a pH of 0 to 1. According to pH, the mixture of Strengite or Metastrengite 2 may be produced.

The crystalline iron phosphate doped with metals obtained through the above-mentioned process may be used as a precursor for preparing an olivine-structured LMFP used as a cathode active material for lithium secondary batteries.

According to still another exemplary embodiment of the present invention, the present invention relates to an olivine-structured LMFP used as a cathode active material for lithium secondary batteries represented by the following Formula II, which is prepared by using the crystalline iron phosphate doped with metals represented by the following Formula I as a precursor.

 MFePO$_4$.2H$_2$O    Formula I

 LiMFePO$_4$    Formula II (in the above Formulas I and II, M is selected from the group consisting of Ni, Co, Mn, Cr, Zr, Nb, Cu, V, Ti, Zn, Al, Ga, and Mg.)

A raw material including Li and carbon coating raw material are dry-mixed with the crystalline iron phosphate doped with metals represented by the above Formula I, and then heated to obtain an olivine-structured LMFP used as a cathode active material for lithium secondary batteries represented by the above Formula II.

In this case, examples of the raw material including Li may include LiOH, $Li_2CO_3$, or LiCl, and examples of the carbon coating raw material may include sucrose, glucose, ascorbic acid, or oleic acid. However, the present invention is not limited thereto.

In this case, the heating is preferably performed at a temperature of 500 to 800° C. under the atmosphere of 1 to 5% $H_2/N_2$ mixed gas for 4 to 12 hours, for example.

Hereinafter, the present invention will be described in more detail with reference to Examples, but the present invention is not limited to the following Examples.

EXAMPLE 1

Synthesis of Amorphous Iron Phosphate ($FePO_4.2H_2O$)

$FeCl_3$ and $(NH_4)_2HPO_4$ were taken out to be a mole ratio of [Fe]:[P] of 1:1, added to pure water, and then mixed to form a slurry. At this time, a ratio of a solid content to a solvent was 10%. Subsequently, ammonia water ($NH_4OH$) was added to the mixed slurry to adjust a pH of 4.5. Subsequently, the pH-adjusted slurry was stirred at a temperature of 60° C. for 15 minutes. Subsequently, the reaction slurry was washed three times using a reduced pressure filter. The washed cake was dried at an oven of 90° C. to synthesize an amorphous iron phosphate.

Synthesis of Crystalline Iron Phosphate Doped with Chrome ($CrFePO_4.2H_2O$)

The amorphous iron phosphate thus obtained and chrome trichloride ($CrCl_3$) were taken out to be a mole ratio of [Fe]:[Cr] of 1-x:x (here, x=0.02), added to pure water, and then mixed to form a slurry. In this case, a volume ratio of a solid content to a solvent was 10%. A phosphoric acid ($H_3PO_4$) was added to the slurry and then pH thereof was 2. Subsequently, the pH-adjusted slurry was stirred at a temperature of 95° C. for 3 hours. The reaction was completed at the time of brightening the color of the slurry. Subsequently, the reaction slurry was washed three times using a reduced pressure filter, and the washed cake was dried at an oven of 90° C. to synthesize a crystalline iron phosphate doped with chrome.

Figure 2:
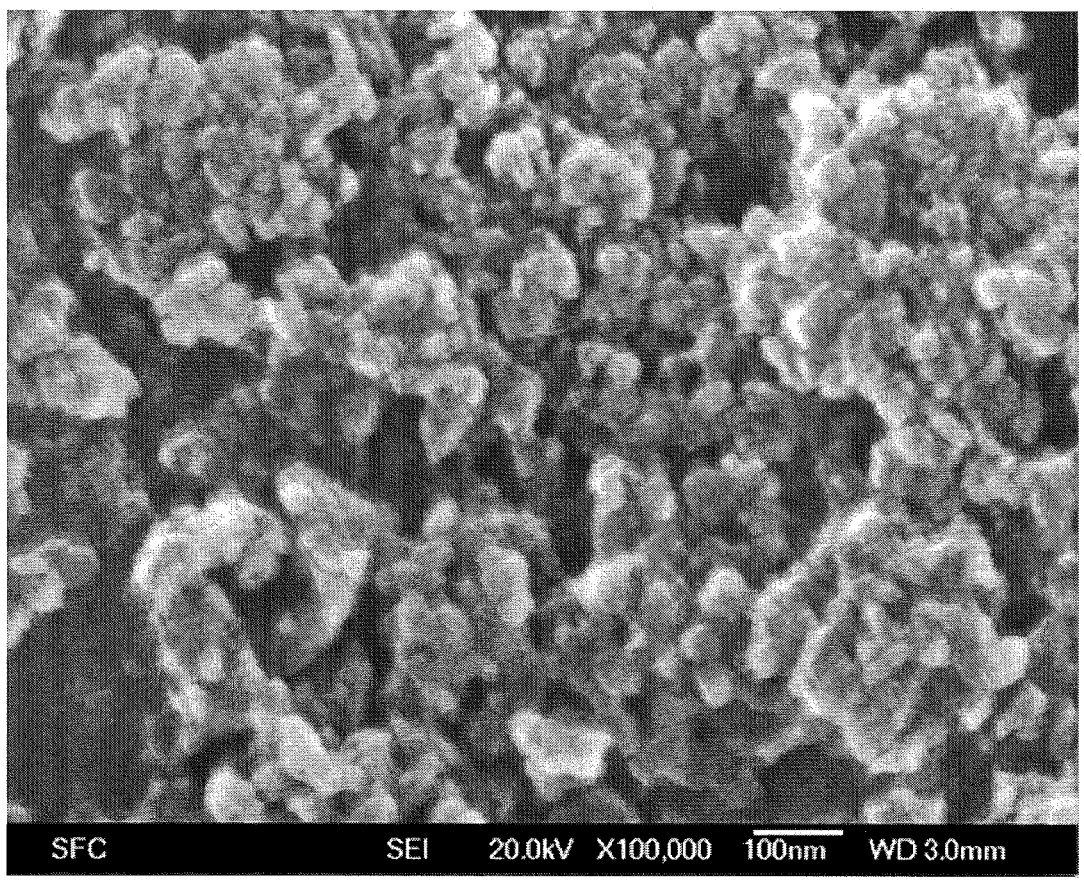
FIG. 2 is an SEM result illustrating an iron phosphate doped with chrome according to an exemplary embodiment of the present invention.

The crystalline iron phosphate doped with chrome was observed using an XRD (D/Max-2500VK/PC manufactured by Rikagu, CuKa radiation, a speed of 4° $min^{-1}$). The diffraction pattern thereof is illustrated in FIG. 1. In addition, the shape of the particles thereof was observed by photographing with an SEM (JSM-7400F manufactured by JEOL, 20 kV). The results thus obtained are illustrated in FIG. 2.

As can be confirmed from FIG. 1, according to an XRD diffraction pattern of the crystalline iron phosphate doped with chrome as obtained above, it has a structure of crystalline Metastrengite 1. In addition, as can be confirmed from FIG. 2, according to an SEM result of the crystalline iron phosphate doped with chrome, the particles thereof have a nano size.

EXAMPLE 2

Synthesis of Amorphous Iron Phosphate ($FePO_4.2H_2O$)

$FeCl_3$ and $(NH_4)_2HPO_4$ were taken out to be a mole ratio of [Fe]:[P] of 1:0.95, added to pure water, and then mixed to form a slurry. At this time, a ratio of a solid content to a solvent was 10%. Subsequently, ammonia water ($NH_4OH$) was added to the mixed slurry to adjust a pH of 4.5. Subsequently, the pH-adjusted slurry was stirred at a temperature of 60° C. for 15 minutes. Subsequently, the reaction slurry was washed three times using a reduced pressure filter. The washed cake was dried at an oven of 90° C. to synthesize an amorphous iron phosphate hydrate.

Synthesis of Crystalline Iron Phosphate Doped with Aluminum ($AlFePO_4.2H_2O$)

The amorphous iron phosphate thus obtained and aluminum trichloride ($AlCl_3$) were taken out to be a mole ratio of [Fe]:[Al] of 1-x:x (here, x=0.02), added to pure water, and then mixed to form a slurry. In this case, a volume ratio of a solid content to a solvent was 10%. A phosphoric acid ($H_3PO_4$) was added to the slurry and then pH thereof was 2. Subsequently, the pH-adjusted slurry was stirred at a temperature of 95° C. for 3 hours. The reaction was completed at the time of brightening the color of the slurry. Subsequently, the reaction slurry was washed three times using a reduced pressure filter, and the washed cake was dried at an oven of 90° C. to synthesize a crystalline iron phosphate doped with aluminum.

The shape of the particles of the crystalline iron phosphate doped with aluminum was observed by photographing with an SEM (JSM-7400F manufactured by JEOL, 20 kV). The results thus obtained are illustrated in FIG. 3.

Figure 3:
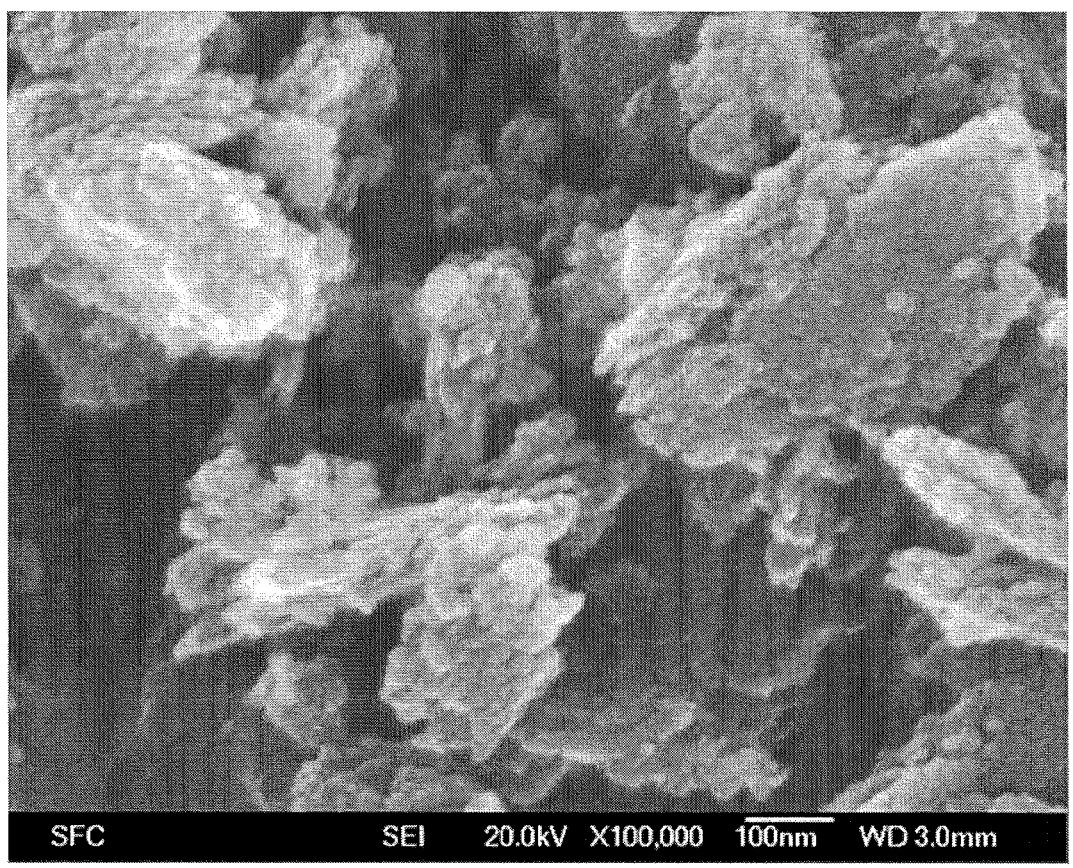
FIG. 3 is an image illustrating an SEM result of an iron phosphate doped with aluminum (AlFePO$_4$) according to another exemplary embodiment of the present invention.

As can be confirmed from FIG. 3, according to an SEM result of the crystalline iron phosphate doped with aluminum obtained, the particles thereof have a nano size.

EXAMPLE 3

Synthesis of $LiCrFePO_4$ Using Crystalline Iron Phosphate Doped with Chrome ($CrFePO_4.2H_2O$)

3.3 g of an Li raw material and 1.2 g of a carbon coating raw material were dry-mixed to 15 g of the crystalline iron phosphate doped with chrome prepared in Example 1. The mixed powder thus obtained was heated at a temperature of 650° C. under the atmosphere of 3% $H_2/N_2$ mixed gas for 8 hours to synthesize $LiCrFePO_4$.

Figure 4:
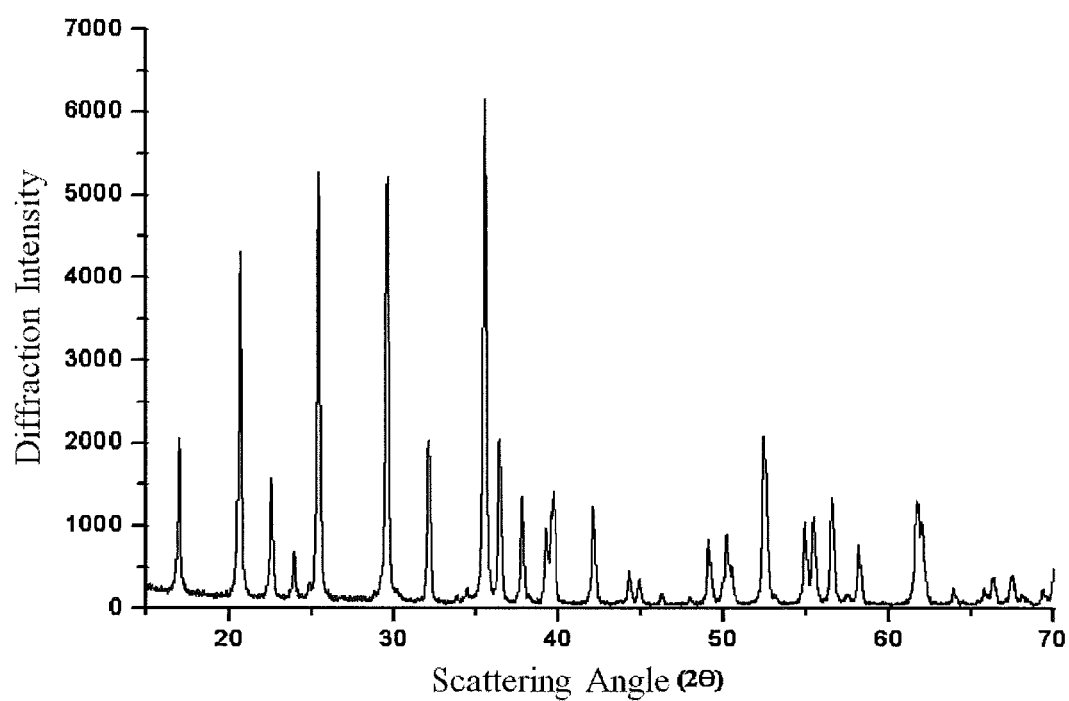
FIG. 4 is a diffraction pattern illustrating LiCrFePO$_4$ prepared by using a crystalline iron phosphate doped with chrome (CrFePO$_4$) according to still another exemplary embodiment of the present invention as a precursor, which is observed by an XRD.
Figure 5:
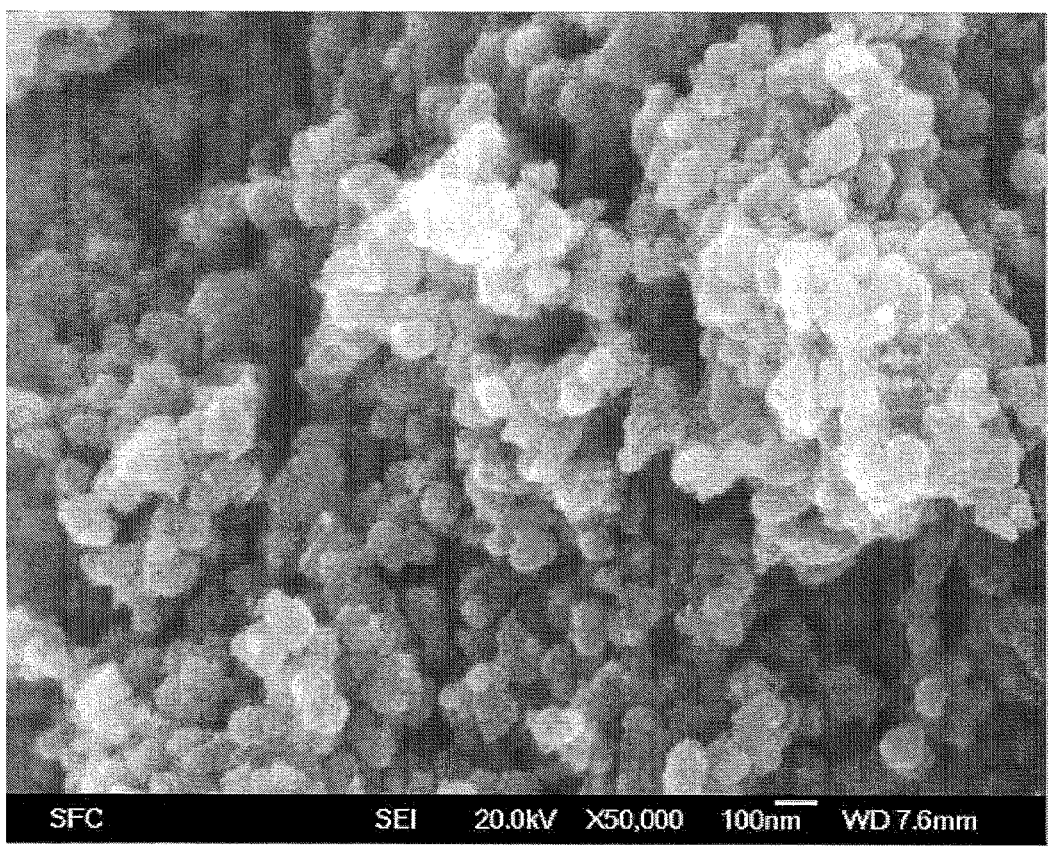
FIG. 5 is an image illustrating an SEM result of LiCrFePO$_4$ synthesized with CrFePO$_4$ according to still another exemplary embodiment of the present invention.

The synthesized $LiCrFePO_4$ was observed by using an XRD. The diffraction pattern thereof is illustrated in FIG. 4. In addition, it was photographed using an SEM and then the shape of the particles thereof was observed. The results thus obtained are illustrated in FIG. 5.

As can be confirmed in FIG. 4, according to the XRD diffraction pattern of $LiCrFePO_4$ synthesized, it has a crystalline olivine-structure. In addition, as can be confirmed in FIG. 5, according to the SEM results of $LiCrFePO_4$ obtained, the particles thereof have a nano size.

EXAMPLE 4

Synthesis of $LiAlFePO_4$ Using Crystalline Iron Phosphate Doped with Aluminum ($AlFePO_4.2H_2O$)

3.3 g of an Li raw material and 1.2 g of a carbon coating raw material were dry-mixed to 15 g of the crystalline iron phosphate doped with aluminum prepared in Example 2. The mixed powder thus obtained was heated at a temperature of 650° C. under the atmosphere of 3% $H_2/N_2$ mixed gas for 8 hours to synthesize $LiAlFePO_4$.

The synthesized $LiAlFePO_4$ was photographed using an SEM and then the shape of the particles thereof was observed. The results thus obtained are illustrated in FIG. 6.

Figure 6:
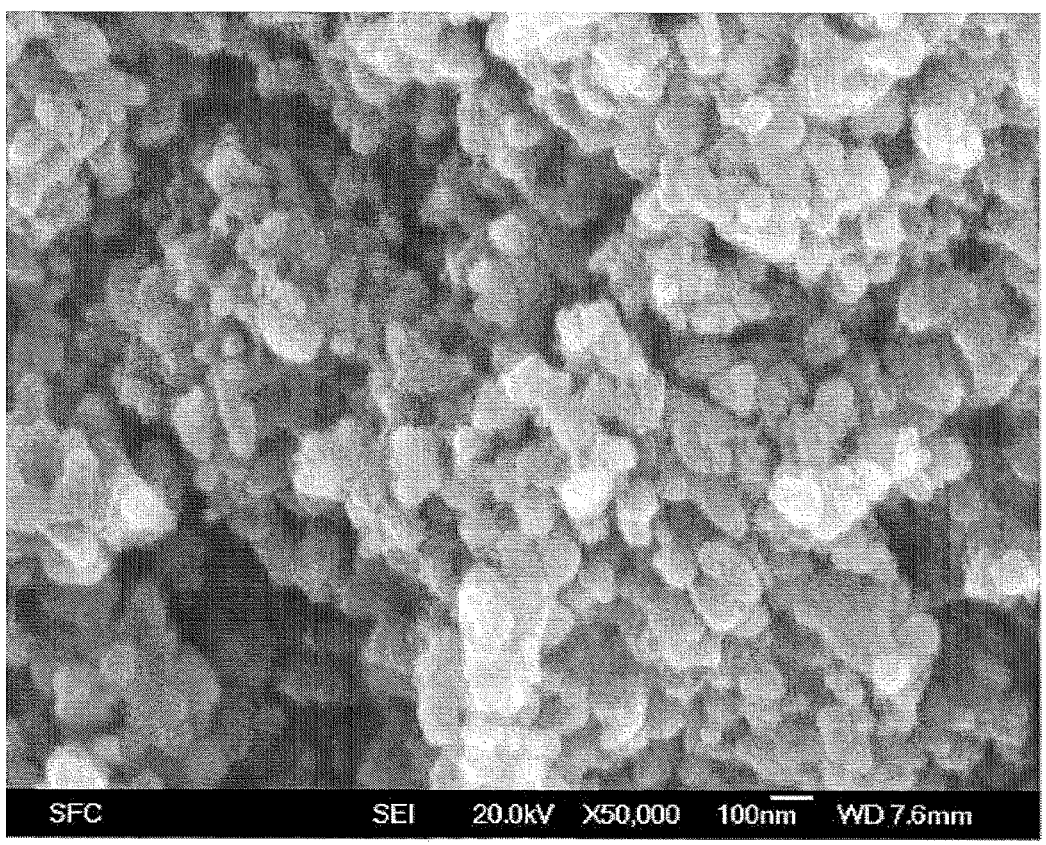
FIG. 6 is an image illustrating an SEM result of LiAlFePO$_4$ synthesized with AlFePO$_4$ according to still another exemplary embodiment of the present invention.

As can be confirmed in FIG. 6, according to the SEM results of LiAlFePO$_4$ obtained, the particles thereof have a nano size.

The crystalline iron phosphate doped with metals, which is prepared by inducing metal doping at the time of preparing a crystalline iron phosphate used as the precursor of an LMFP, has the following effects:

Firstly, efficiency on preparing an olivine-structured LMFP as a crystalline iron phosphate doped with metals can be increased and the processing costs can be reduced as compared with a method of preparing it by mixing different types of metals in a solid state.

Secondly, it is possible to prepare a metal composition of an LMFP or an iron phosphate doped with metals, variously because of a liquid state process.

Thirdly, since it is a liquid state process performing mixing and crystallizing in a liquid state during preparing the precursor, it is possible to reduce the processing costs without an additional mixing process.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A crystalline iron phosphate doped with metals represented by the following Formula I, the crystalline iron phosphate doped with metals being doped with different types of metals while crystallizing an amorphous iron phosphate:

MFePO$_4$·2H$_2$O           Formula I here, M is selected from the group consisting of Ni, Co, Mn, Cr, Zr, Nb, Cu, V, Ti, Zn, Al, Ga, and Mg, wherein a crystal structure of the crystalline iron phosphate doped with metals includes Metastrengite 1.

2. The crystalline iron phosphate doped with metals according to claim 1, wherein a mole ratio of [Fe] and [M] is 1−x:x, and here, x is 0.01 to 0.05.

3. A method of preparing a crystalline iron phosphate doped with metals represented by the following Formula I, the method comprising:
   forming an amorphous iron phosphate;
   mixing the amorphous iron phosphate thus obtained with a different type of metallic salt; and
   crystallizing the amorphous iron phosphate mixed with the different type of metallic salt:

MFePO$_4$·2H$_2$O           Formula I here, M is selected from the group consisting of Ni, Co, Mn, Cr, Zr, Nb, Cu, V, Ti, Zn, Al, Ga, and Mg, wherein a crystal structure of the crystalline iron phosphate doped with metals includes Metastrengite 1.

4. The method according to claim 3, wherein during crystallizing by mixing the amorphous iron phosphate and the different type of metallic salt, a mole ratio of [Fe] and [M] is 1−x:x, and here, x is 0.01 to 0.05.

5. The method according to claim 3, wherein the different type of metallic salt has a structure, MX$_3$ here, M is selected from the group consisting of Ni, Co, Mn, Cr, Zr, Nb, Cu, V, Ti, Zn, Al, Ga, and Mg, and X is an anion including halogen.

6. The method according to claim 3, wherein the amorphous iron phosphate in a type of slurry is mixed with an aqueous solution of the different type of metallic salt in a liquid state.

* * * * *